(12) United States Patent
dos Santos Fegadolli

(10) Patent No.: US 11,256,049 B2
(45) Date of Patent: Feb. 22, 2022

(54) OPTICAL-TO-ELECTRIC-TO-OPTICAL ROUTING ENGINE

(71) Applicant: Nokia Solutions and Networks Oy, Espoo (FI)

(72) Inventor: William dos Santos Fegadolli, Azusa, CA (US)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 16/855,618

(22) Filed: Apr. 22, 2020

(65) Prior Publication Data

US 2021/0333494 A1 Oct. 28, 2021

(51) Int. Cl.
*G02B 6/42* (2006.01)

(52) U.S. Cl.
CPC ......... *G02B 6/4269* (2013.01); *G02B 6/4206* (2013.01); *G02B 6/4228* (2013.01); *G02B 6/4238* (2013.01); *G02B 6/4239* (2013.01)

(58) Field of Classification Search
CPC .. G02B 6/4206; G02B 6/4228; G02B 6/4238; G02B 6/4239; G02B 6/4269
See application file for complete search history.

(56) References Cited

U.S. PATENT DOCUMENTS

| | | | |
|---|---|---|---|
| 6,181,864 B1 | 6/2001 | Jang et al. | |
| 6,377,732 B1 | 4/2002 | Li et al. | |
| 6,696,755 B2 * | 2/2004 | Kami | G02B 6/4201 257/728 |
| 7,084,496 B2 * | 8/2006 | Benner | G02B 6/4269 257/730 |
| 7,542,636 B2 | 6/2009 | Blauvelt et al. | |
| 7,766,559 B2 * | 8/2010 | Epitaux | G02B 6/4249 385/89 |

(Continued)

OTHER PUBLICATIONS

Sood, Ashok K., et al. "SiGe Based Visible-NIR Photodetector Technology for Optoelectronic Applications." Chapter 10 of Advances in Optical Fiber Technology: Fundamental Optical Phenomena and Applications (2015): 315-361.

(Continued)

*Primary Examiner* — Ryan A Lepisto
(74) *Attorney, Agent, or Firm* — Mendelsohn Dunleavy, P.C.; Yuri Gruzdkov

(57) ABSTRACT

An apparatus includes a dielectric support substrate with one or more planar major surfaces and one or more optical fiber interfaces fixed to the support substrate adjacent one of the one or more planar major surfaces. Each optical fiber interface has optical modulators and photodetectors. The apparatus also includes one or more digital signal processing chips fixed to the support substrate adjacent one of the one or more planar major surfaces, and laterally separated from and communicatively connected via metallic lines to the one or more optical fiber interfaces. The apparatus also includes a first set of one or more metallic heatsinks adjacent the one or more digital signal processing chips to provide heat dissipation therefrom. The apparatus also includes a second set of one or more metallic heatsinks being located adjacent the one or more optical fiber interfaces to provide heat dissipation therefrom and physically separated by a distance from the one or more metallic heatsinks of the first set.

18 Claims, 3 Drawing Sheets

(56) References Cited

U.S. PATENT DOCUMENTS

| | | | |
|---|---|---|---|
| 8,483,528 | B2 | 7/2013 | Socci et al. |
| 8,750,654 | B2 | 6/2014 | Dupuis et al. |
| 8,971,676 | B1 * | 3/2015 | Thacker .................. G02B 6/12 |
| | | | 385/14 |
| 9,250,403 | B2 * | 2/2016 | Thacker ............... G02B 6/4274 |
| 9,297,971 | B2 * | 3/2016 | Thacker ............. H01L 25/0655 |
| 9,596,761 | B2 * | 3/2017 | Bouda .................. H05K 1/0203 |
| 9,671,572 | B2 * | 6/2017 | Decker ................ G02B 6/4204 |
| 9,927,575 | B2 | 3/2018 | Goodwill et al. |
| 10,025,043 | B2 | 7/2018 | Vallance et al. |
| 10,345,522 | B2 | 7/2019 | Daniel |
| 10,365,436 | B2 * | 7/2019 | Byrd ........................ G02B 6/14 |
| 10,866,376 | B1 * | 12/2020 | Ghiasi ...................... G02B 6/43 |
| 10,921,534 | B2 * | 2/2021 | Dong .................. G02B 6/4224 |
| 2004/0037519 | A1 | 2/2004 | Kilian |
| 2005/0013558 | A1 | 1/2005 | Powers |
| 2005/0053319 | A1 | 3/2005 | Doan |
| 2007/0132064 | A1 | 6/2007 | Mei et al. |
| 2007/0237444 | A1 | 10/2007 | Keil |
| 2013/0230272 | A1 * | 9/2013 | Raj ........................ G02B 6/428 |
| | | | 385/14 |
| 2014/0270784 | A1 | 9/2014 | Thacker et al. |
| 2015/0037044 | A1 | 2/2015 | Peterson et al. |
| 2015/0125110 | A1 | 5/2015 | Anderson et al. |
| 2015/0293305 | A1 | 10/2015 | Nakagawa et al. |
| 2018/0196196 | A1 | 7/2018 | Byrd et al. |
| 2018/0329159 | A1 * | 11/2018 | Mathai .................. G02B 6/423 |
| 2019/0243164 | A1 | 8/2019 | Nelson et al. |
| 2019/0258175 | A1 | 8/2019 | Dietrich et al. |
| 2019/0391348 | A1 * | 12/2019 | Osenbach .............. H04B 10/40 |

OTHER PUBLICATIONS

Feng, Dazeng, et al. "High-speed Ge photodetector monolithically integrated with large cross-section silicon-on-insulator waveguide." Applied Physics Letters 95.26 (2009): 261105-1-261105-3.

Inside the Silicon Photonics Transceiver, www.melanox.com, 2020 [retrieved on Mar. 10, 2020] Retrieved from the Internet: <URL: https://community.mellanox.com/s/article/inside-the-silicon-photonics-transceiver> (5 pages).

Technology—Luxtera, www.luxtera.com, 2020 [retrieved on Mar. 10, 2020] Retrieved from the Internet: <URL: http://www.luxtera.com/silicon-photonics-technology/> (5 pages).

U.S. Appl. No. 16/595,698 "Electro-Optical Apparatus Having High-Throughput Electrical Data Links" filed Oct. 8, 2019; (36 pages).

Photonics for Datacenters: Integrated optics permeate datacenter networks, www.laserworldfocus.com, 2018 [retrieved on Feb. 13, 2020] Retrieved from the Internet: URL: https://www.laserfocusworld.com/optics/article/16555340/photonics-for-datacenters-integrated-optics-permeate-datacenter-networks (17 pages).

S. Klinger et al., "Ge-on-Si p-i-n Photodiodes With a 3-dB Bandwidth of 49 GHz", IEEE Photonics Technology Letters, vol. 21, No. 13, Jul. 1, 2009, pp. 920-922.

J. Wang et al., "Ge-Photodetectors for Si-Based Optoelectronic Integration", Sensors, vol. 11, 2011, pp. 696-718.

D. Sparacin, "Silicon Photonics", Juniper Networks, Nov. 2019, pp. 1-21.

M. Feldman, "On-Chip Optical Links Are One Step Closer to Reality", The Next Platform, Sep. 11, 2019, 10 pages, Webpage available at: https://www.nextplatform.com/2019/09/11/on-chip-optical-links-are-one-step-closer-to-reality/.

C. Minkenberg et al, "Photonics for Datacenters: Integrated Optics Permeate Datacenter Networks", Laser Focus World, Oct. 1, 2018, 9 pages, Webpage available at : https://www.laserfocusworld.com/optics/article/16555340/phototonics-for-datacenters-integrated-optics-permeate-datacenter-networks.

P. De Dobbelaere, "Silicon Photonics Technology Platform for Integration of Optical IOs with ASICs", 2013 IEEE Hot Chips 25 Symposium (HCS), 2013, 18 pages.

"Infinera Unveils Multi-Terabit Optical Transport", Broadband Technology Report, Sep. 21, 2011, 12 pages, Webpage available at: https://www.broadbandtechreport.com/home/article/16441542/infinera-unveils-multiterabit-optical-transport.

U.S. Appl. No. 16/855,455, "Photonic Integrated Circuit for a Plurality of Optical Transmitters and Receivers", filed Apr. 22, 2020, 35 pages.

Chen, Xia, et al. "The Emergence of Silicon Photonics as a Flexible Technology Platform." Proceedings of the IEEE 106.12(2018): 2101-2116.

Chen, Long, et al. "Low-Loss and Broadband Cantilever Couplers Between Standard Cleaved Fibers and High-Index-Contrast Si3N4 or Si Waveguides." IEEE Photonics Technology Letters 22.2 (2010): 1744-1746.

Cheben, Pavel, et al. "Broadband polarization independent nanophotonic coupler for silicon waveguides with ultra-high efficiency," Optics Express 23.17, 22553-22563 (2015).

Fadel, Maxim, et al. "Low-Loss and Low-Birefringence High-Contrast Silicon-Oxynitride Waveguides for Optical Communication." Journal of Lightwave Technology 27.6 (2009): 698-705.

\* cited by examiner

OPTICAL-TO-ELECTRIC-TO-OPTICAL ROUTING ENGINE

BACKGROUND

Technical Field

The invention relates to apparatus for optical data routing and methods for using such apparatus.

Related Art

This section introduces aspects that may be help to facilitate a better understanding of the inventions. Accordingly, the statements of this section are to be read in this light and are not to be understood as admissions about what is prior art or what is not prior art.

Due to increasing data rate requirements, optical data transceivers have become useful to interconnect the nodes of both short reach and long reach links of data networks. Unfortunately, higher data rates can substantially increase power requirements in such data networks.

In optical fiber, data networks, optical-to-electrical-to-optical data switches and/or routers often consume a substantial portion of the total supplied power due to resistive dissipation along the metallic interconnections between digital signal processing chips and optical data transceivers. Thus, the overall power consumption may be reduced by locating optical fiber interfaces, which include opto-electric hardware for optical data transceivers, close to the digital signal processing chips, which provide for data switching and/or routing and/or other digital signal processing. Indeed, such configurations may both lower resistive losses and requirements for signal retiming, i.e., due to the shorter lengths of the metallic paths between the opto-electrical fiber interfaces and digital signal processing chips. Such configurations may be further improved by locating arrays of optical transceiver hardware in the optical fiber interfaces to lower overall footprints.

SUMMARY OF SOME ILLUSTRATIVE EMBODIMENTS

Some embodiments provide improved reliability to devices including both optical fiber interface(s) and digital signal processing chip(s). The improved reliability may result, in part, from configurations that enable a better management of the heat generated by digital signal processing chip(s) and optical fiber interface(s). In part, due to features of these configurations, said two groups of heat generating structures can be maintained at different temperatures during steady-state operation. For example, the optical interface(s) may be maintained at a substantially lower temperature than some or all of the digital signal processing chip(s) even if the configuration(s) have increased resistive losses due to the longer length of metallic lines connecting the digital signal processing chip(s) to the optical fiber interface(s). In particular, the higher steady-state operating temperatures of said digital signal processing chip(s) might otherwise cause degradation of the optical fiber interface(s), e.g., damage physical connections to end segments of optical fibers thereto.

In first embodiments, an apparatus includes a dielectric support substrate with one or more planar major surfaces and one or more optical fiber interfaces fixed to the support substrate adjacent one of the one or more planar major surfaces. Each optical fiber interface has optical modulators and photodetectors. The apparatus includes a group of one or more digital signal processing chips fixed to the support substrate adjacent one of the one or more planar major surfaces, and laterally separated from and communicatively connected via metallic lines to the one or more optical fiber interfaces. The apparatus includes a first set of one or more metallic heatsinks adjacent the one or more digital signal processing chips to provide heat dissipation therefrom. The apparatus includes a second set of one or more metallic heatsinks located adjacent the one or more optical fiber interfaces to provide heat dissipation therefrom. The second set of one or more heatsinks is physically separated by a distance from the one or more metallic heatsinks of the first set.

In any of the first embodiments, each of the one or more optical fiber interfaces may include a monolithically integrated opto-electrical device or a flip-chip connected two-chip opto-electrical module.

In any of the first embodiments, each of the one or more optical fiber interfaces may be mechanically connected to the support substrate via an array of metallic socket connectors.

In any of the first embodiments, the sets of one or more metallic heatsinks may be configured to maintain the one or more optical fiber interfaces, at least, 10 degrees Centigrade (° C.), preferably, at least, 20° C., and even, at least, 30° C. cooler than the one or more digital signal processing chips during steady state operation of the apparatus. Such cooler operation of the optical fiber interface(s) can improve the reliability and/or lifetime of the apparatus.

In any of the first embodiments, at least, one of the one or more digital signal processing chips may include digital serializer and/or deserializer circuitry configured to perform one of or both of processing digital data for transmission to one of the one or more optical fiber interfaces and processing digital measurements received from one of the one or more optical fiber interfaces.

In any of the first embodiments, the apparatus may further include a plurality of optical fibers having end segments aligned to optically couple to one of the one or more optical fiber interfaces on a major optical surface of one of the one or more optical fiber interfaces. Such embodiments may also include glue or solder fixing and/or aligning said end segments with respect to the one of the one or more optical fiber interfaces. Embodiments of this paragraph may include an optical fiber holder that is adjacent the major optical surface and holds said end segments in V-grooves thereof, e.g., glue or solder may fix said end segments to said optical fiber holder.

Figure 1:
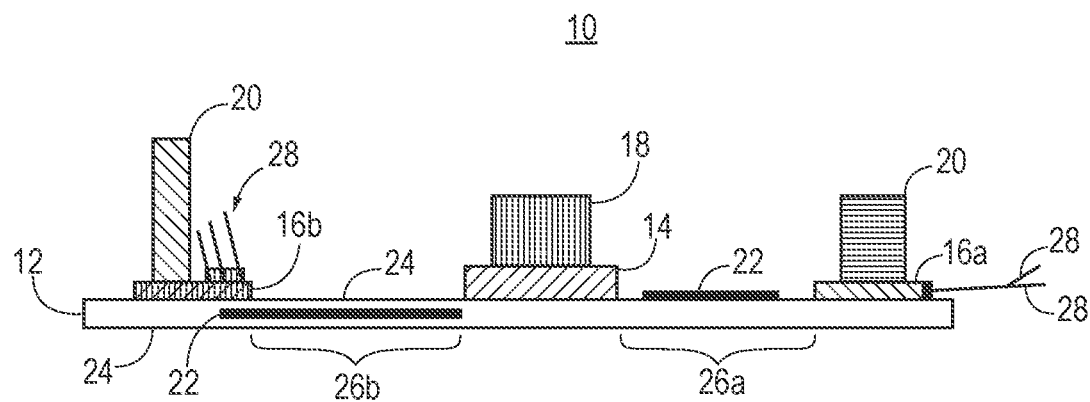
FIG. 1 is a cross-sectional view schematically illustrating an apparatus with one or more digital signal processing chips and optical fiber interfaces.

In various Figures, relative dimension(s) of some feature(s) may be exaggerated to more clearly illustrate the feature(s) and/or relation(s) to other feature(s) therein.

In the various Figures, similar reference numbers may be used to indicate similar structures and/or structures with similar functions.

Herein, various embodiments are described more fully by the Figures and the Detailed Description of Illustrative Embodiments. Nevertheless, the inventions may be embodied in various forms and are not limited to the embodiments described in the Figures and the Detailed Description of Illustrative Embodiments.

DETAILED DESCRIPTION OF ILLUSTRATIVE EMBODIMENTS

Herein, an optical fiber interface includes structures for optically coupling to ends of optical fibers and has opto-electrical devices for inter-converting between electrical digital data stream(s) and data-modulated optical signal(s). Typically, an optical fiber interface has optical data modulator(s) to output data-modulated optical signal(s) to optical fiber(s) in response to receiving digital data and has photo-detectors and electrical circuitry for converting data modulated optical signal(s) received from optical fiber(s) into digital measurements. The optical fiber interface may include analog electrical circuitry such as electrical driver(s) to operate the optical modulator(s) and analog electric circuitry such as low pass filter(s), amplifier(s), and analog-to-digital converters for converting outputs of the photodetector(s) into stream(s) of digital measurements. The optical fiber interface may or may not include devices to physically align and hold ends of the optical fibers with respect to optical input(s) and/or optical output(s) thereof and may or may not include optical sources, e.g., communication laser(s), for producing carrier light for modulation by optical data modulator(s) and/or for use as local optical oscillators in coherent optical detector(s) of some embodiments thereof.

This application incorporates herein, by reference, in its entirety, U.S. patent application Ser. No. 16/855,455, titled "PHOTONIC INTEGRATED CIRCUIT FOR A PLURALITY OF OPTICAL TRANSMITTERS AND RECEIVERS" by William dos Santos Fegadolli, which is being filed concurrently on Apr. 22, 2020 (herein referred to as "OPTICAL FIBER INTERFACE application").

To provide better thermal operating conditions, various embodiments provide physical isolation and thermal-management separation between optical devices, e.g., between the optical fiber interfaces, optical fibers, and fiber connectors, and the digital signal processing chip(s), which may tolerate different temperatures. For example, said optical devices and digital signal processing chip(s) are fixed to a dielectric support substrate, e.g., an organic substrate, rather than a highly thermally conductive, support substrate. Also, the digital signal processing chip(s) is (are) laterally separated from the optical devices along a major surface of the support substrate. Also, the optical devices and the digital signal processing chip(s) are primarily cooled by physically separated heatsinks to enable largely separate thermal management. Such physical and thermal-management separation enables maintenance of significant temperature gradient(s) between the optical devices and the digital signal processing chip(s) during steady-state operation, e.g., steady-state thermal and optical data communication operations.

Figure 2:
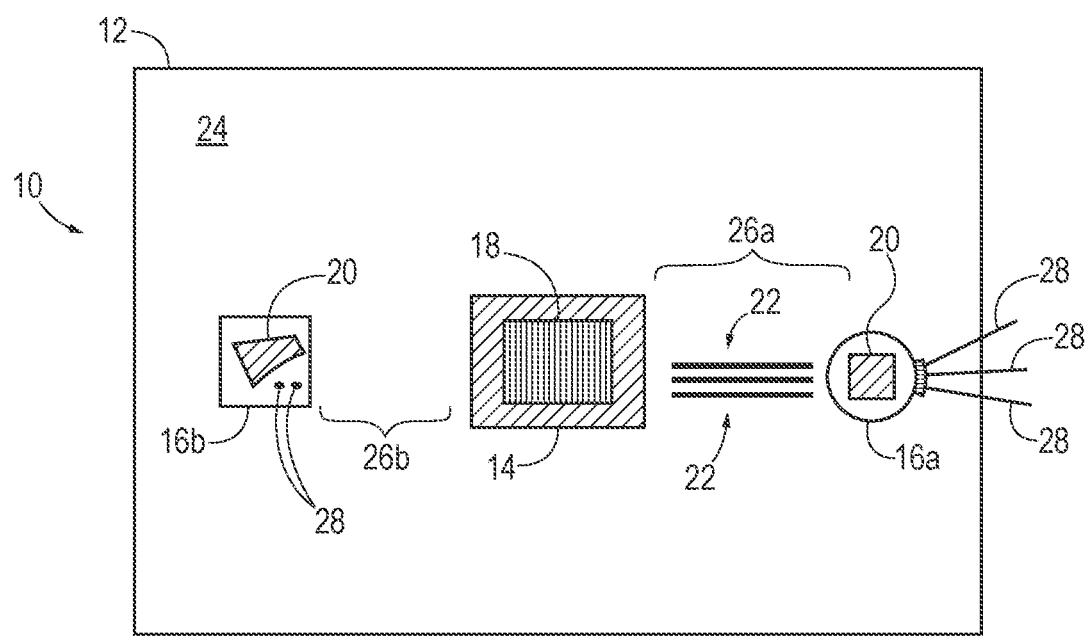
FIG. 2 is a top view schematically illustrating the apparatus of FIG. 1.

FIGS. 1 and 2 schematically illustrate an apparatus 10 for communicating via optical fibers based on optical-to-electrical-to-optical (OEO) data conversion. The apparatus 10 may perform, e.g., optical routing or switching between the same and/or different optical fibers 28, and/or may locally add and/or drop data-modulated optical signals. The apparatus 10 includes a support substrate 12; one or more digital signal processing chips 14; one or more optical fiber interfaces 16*a*, 16*b*; and two sets of heatsink(s) 18, 20.

The support substrate 12 is typically planar and is formed primarily of dielectric, e.g., a planar organic substrate having some metallic connectors thereon and/or therein. The support substrate 12 provides mechanical support, e.g., rigid support, for the one or more digital signal processing chips 14 and the optical fiber interface(s) 16*a*, 16*b*. The digital signal processing chip(s) 14 and optical fiber interface(s) 16*a*, 16*b* are fixed to one or both planar major surface(s) 24 of the support substrate 12 and are on and/or adjacent said planar major surface(s) 24. Along the planar major surface(s) 24, the one or more digital signal processing chips 14 is/are laterally separated from the one or more optical fiber interfaces 16*a*, 16*b*. In particular, the footprint of each digital signal processing chip 14 on said planar major surface(s) 24 does not overlap the footprint of the optical fiber interface(s) 16*a*, 16*b*. Instead, there is a physical gap 26*a*, 26*b* along the planar surface 24 between the footprint of each digital signal processing chip 14 and the footprint of each optical fiber interface 16*a*, 16*b*.

In part, due to the physical gap(s) 26*a*, 26*b* and the primarily dielectric composition of the planar support substrate 12, a suitable temperature gradient may be maintained between the one or more digital signal processors 14 and each optical fiber interface 16*a*, 16*b* during operation of the apparatus 10. Such temperature gradient(s) can typically be maintained during both steady-state thermal operation and steady-state communication operation. The temperature gradient(s) enable(s), e.g., maintenance of the optical fiber interface(s) 16*a*, 16*b* at lower operating temperature(s). Since some optical devices are more susceptible to degradation at higher temperatures than the digital signal processing chip(s) 14, such temperature gradient(s) can increase the reliability and/or lifetime of the optical fiber interfaces 16*a*, 16*b*, the optical fibers 28 and mechanical optical fiber holders adjacent thereto.

The one or more of the digital signal processing chip(s) 14 include(s) digital hardware for handling and processing digital signals. Said digital hardware may include, e.g., digital serializing and/or deserializing (SERDES) circuitry and may include other digital circuitry for pre-conditioning digital data for optical and/or electrical transmission and/or for post-conditioning digital data and/or digital measurements received via optical and/or electrical transmission. Some of the other digital circuitry may provide, e.g., for forward error correction, error detection, data symbol mapping and/or demapping, and/or pre- and/or post-compensation for degradations caused by optical and/or electrical transmission of data. Such digital circuitry of the one or more of the digital signal processing chips 14 may be capable of operating at a substantially higher temperature than one or both of the optical fiber interfaces 16*a*, 16*b*.

Some such digital circuitry, e.g., digital SERDES circuitry, may also be strong source(s) of heat during operation. For these reasons, the maintenance of temperature gradient(s) between the one or more digital signal processing chips 14 and the optical fiber interface(s) 16a, 16b is often desirable.

Each optical fiber interface 16a, 16b includes physical optical ports for coupling to the ends of the optical fibers 28 and also has electrical and mechanical connections to the support substrate 12. The physical optical ports may provide edge and/or face optical coupling to nearby ends of the optical fibers 28, e.g., as illustrated by the edge and face optical fiber coupling configurations of optical fiber interfaces 16a and 16b, respectively. The physical optical ports and/or optical couplers thereto may include/use, e.g., optical grating couplers, focusing optics and/or optical mode converters. The electrical and mechanical connections to the support substrate 12 may be based on any conventional electrical and mechanical connectors, e.g., solder bumps and/or array(s) thereof. Some such connections electrically connect the optical fiber interfaces 16a, 16b to one or more digital signal processing chips 14, e.g., through conventional metallic connection lines 22 located on and/or buried in the support substrate 12.

Each optical fiber interface 16a, 16b also includes hardware for inter-converting between data-carrying optical signals and digital electrical signals. The hardware typically includes optical data modulator(s) and electrical driver(s) thereof, and photodiode(s) and related analog electrical circuitry. The hardware may also include optical devices for conventional optical processing, e.g., optical coupler(s), optical mode converter(s), variable optical attenuator(s), adjustable optical phase shifter(s), optical hybrid(s), intensity and/or polarization splitter(s), and/or optical wavelength multiplexer(s)/demultiplexer(s).

The optical data modulator(s) modulate optical carrier(s) with digital data stream(s) received from the digital data processor(s) 14 and output the data-modulated optical carrier(s), via optical couplers, to one or more of the optical fibers 28 via the physical optical port(s) of the optical fiber interface(s) 16a, 16b. The optical carrier(s) for modulation may be provided internally or externally to the optical fiber interface(s) 16a, 16b. For example, the optical carrier(s) may be provided by laser(s) coupled to the optical fiber interface(s) 16a, 16b by one or more of the optical fibers 28. The optical data modulation includes converting digital data stream(s) received from the data processing chip(s) 14 into appropriate analog signals for driving the optical data modulator(s). The optical data modulator(s) may be any conventional optical modulators for amplitude and/or phase modulation of data stream(s) onto optical carrier(s), e.g., appropriate Mache-Zehnder optical modulators, optical ring-resonator modulators and/or optical electro-absorption modulators.

The photodetector(s) and analog electrical circuitry produce(s) stream(s) of digital measurements of the data-modulated optical signal(s) received from the optical fiber(s) 28 by the physical optical port(s) of the optical fiber interface(s) 16a, 16b. The photodetector(s) may be single or differentially paired photodiodes, and the analog electrical circuitry may include biasing circuit(s), measurement circuit(s) (e.g., for balanced or differential detection), electric amplifier(s) (e.g., transimpedance amplifier(s)), low-pass electrical filter(s), clock data recovery circuitry, and/or analog-to-digital converters. The analog electrical circuitry transmits the stream(s) of digital measurements to the digital signal processing chip(s) 14 via metallic connection lines 22, e.g., for data recovery and/or other digital processing.

Some embodiments of the apparatus 10, 10' and the optical fiber interfaces 16a, 16b, 16b' of FIGS. 1-8 may, e.g., have structures, be operated, and/or be fabricated as described, e.g., in the OPTICAL FIBER INTERFACE application, which is incorporated in the present application.

The first set of the one or more heatsinks 18 has portions contacting or near to the digital signal processing chip(s) 14, and the second set of one or more heatsinks 20 has portions contacting or near to the optical fiber interface(s) 16a, 16b. The heatsinks 18, 20 may be conventional heatsinks and may or may not include conventional thermal interface material(s) at or between contact areas with the digital signal processing chips(s) 14 and/or the optical fiber interface(s) 16a, 16b. Physical separation(s) between the first and second sets of heatsink(s) 18, 20 enable the cooling of the digital signal processing chips(s) 14, and the optical fiber interface(s) 16a, 16b to be largely separate, e.g., substantially independently manageable. This physical separation of the two sets of heatsink(s) 18, 20 may also aid to enabling operation of the digital signal processing chips(s) 14 at different temperature(s) than the optical fiber interface(s) 16a, 16b, e.g., during steady-state thermal and communication operations.

Due to one or more of the above-described features, some embodiments of the apparatus 10 are able to maintain a substantially lower maximal temperature for the optoelectrical devices, e.g., the optical fiber interface(s) 16a, 16b, than the digital signal processing chip(s) 14 during optical data communication. As an example, the optical fiber interfaces 16a, 16b may be, able to be maintained, at least, 10° C., 20° C., or even 30° C. cooler than some of or all of the one or more digital signal processing chips 14 during steady-state thermal and optical data communication operations. Such cooler operation can improve overall performance, reliability, and/or lifetime of optical data modulators and/or photodetectors as well as enhancing lifetimes of physical connectors of the optical fibers and/or the optical fibers 28 themselves. For example, such cooler operation may improve the lifetime and/or reliability of epoxy connections used to physically fix and mechanically stabilize nearby end-segments of the optical fibers with respect to the optical fiber interface(s) 16a, 16b.

Figure 3:
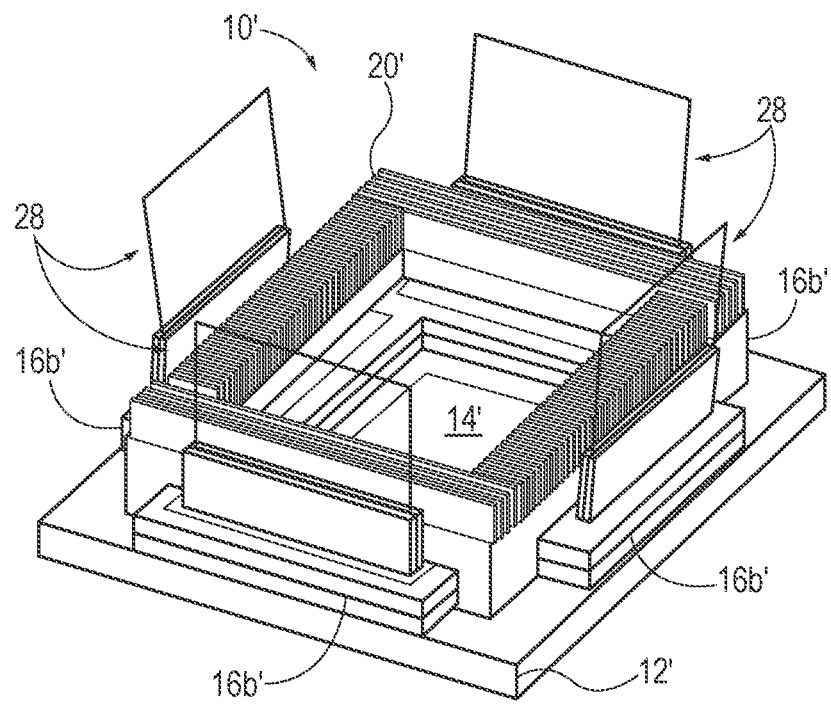
FIG. 3 is an oblique view illustrating a specific embodiment of the apparatus of FIGS. 1-2.
Figure 4:
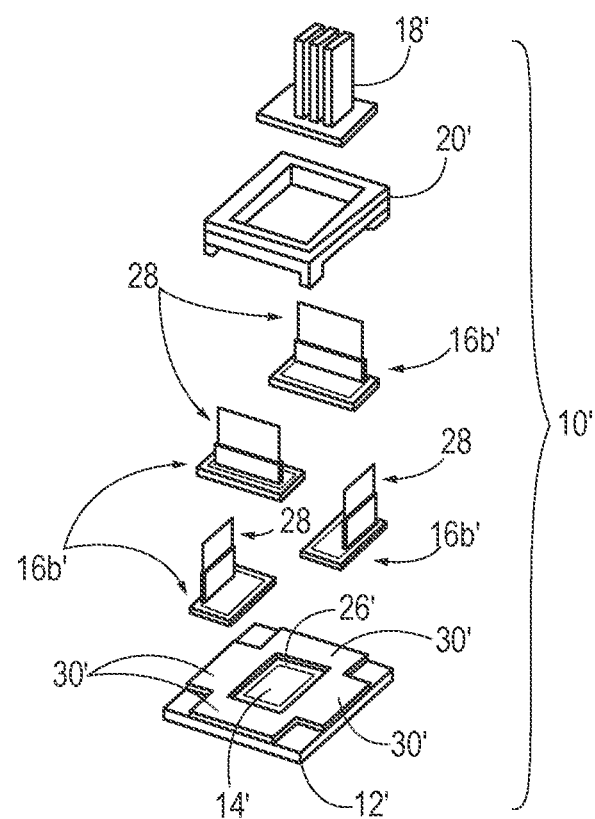
FIG. 4 is a break-apart view of the apparatus of FIG. 3 separately showing the optical fiber interfaces, heatsinks, and support substrate with a digital signal processing chip.
Figure 5:
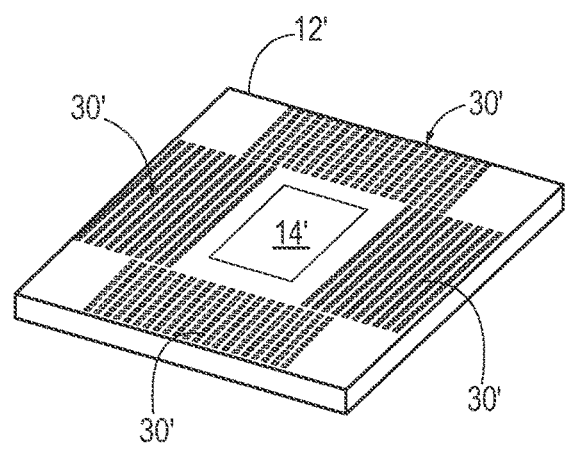
FIG. 5 is an oblique view illustrating example solder bump arrays of the support substrate of FIGS. 3-4 for mechanically and electrically connecting the optical fiber interfaces.
Figure 6:
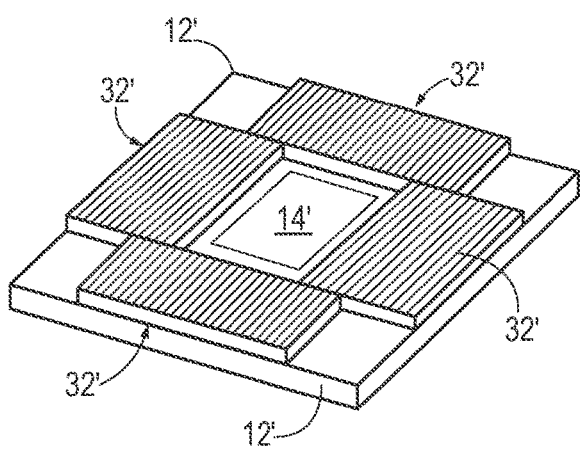
FIG. 6 is an oblique view illustrating metallic connectors of the optical fiber interfaces on solder bump arrays of the support substrate of FIG. 5 after assembly.
Figure 7:
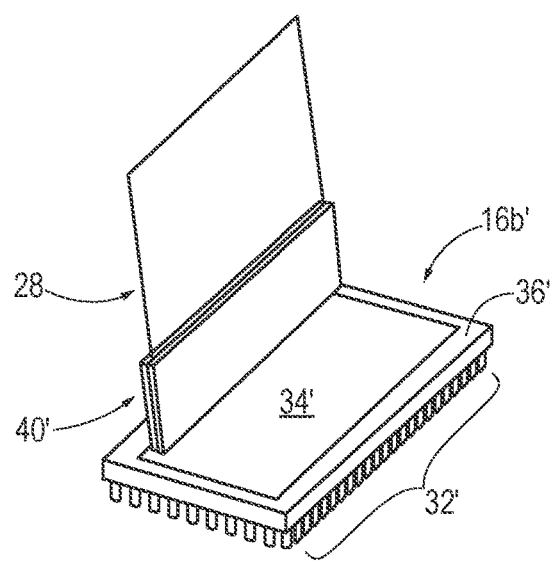
FIG. 7 is an oblique view of one of the optical fiber interfaces of FIGS. 3-4.
Figure 8:
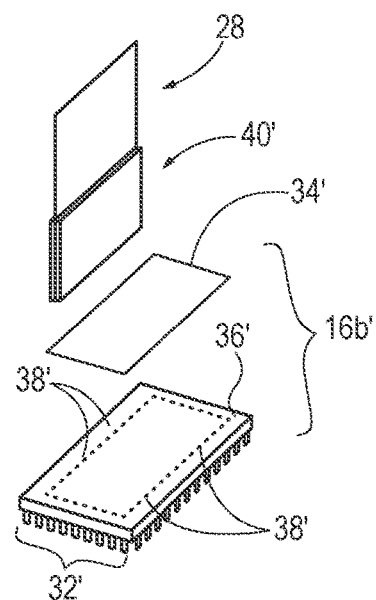
FIG. 8 is a break-apart view of the optical fiber interface of FIG. 7, end segments of optical fibers coupled thereto, a planar opto-electrical interface, and a mechanical support block with metallic connectors as illustrated in FIG. 6.

FIGS. 3-8 illustrate a specific embodiment 10' of the apparatus 10 of FIGS. 1-2 for optically end-coupling to four linear arrays of end segments of the optical fibers 28. FIG. 3-4 illustrate the apparatus 10' by a largely assembled view, i.e., FIG. 3, and a break apart view, i.e., FIG. 4. FIGS. 5-6 illustrate solder bump arrays 30' of the support substrate 12' of FIGS. 3-4 and metallic connectors 32' thereto of the optical fiber interfaces 16b'. FIGS. 7-8 illustrate one of the optical fiber interfaces 16b' of FIGS. 3-4.

Referring to FIGS. 3-4, the apparatus 10' includes an example 12' of the support substrate 12 of FIGS. 1-2, an example 14' of the digital signal processing chips(s) 14 of FIGS. 1-2, four examples 16b' of the optical fiber interfaces 16a, 16b of FIGS. 1-2, and examples 18', 20' of the heatsinks 18, 20 of FIGS. 1-2.

The optical fiber interfaces 16b' are located on the same major surface of the support substrate 10' as the digital signal processing chip 14' and are located around the digital signal processing chip 14'. The digital signal processing chip 14' provides digital processing of data to be transmitted to some or all of the optical fibers 28 via the optical fiber interfaces 16b' and provides digital processing of digital measurements by the optical fiber interfaces 16b' of data-modulated optical signals received from some or all of the optical fibers 28, e.g., as described with respect to FIGS. 1-2. The optical fiber interfaces 16b' and the digital signal processing chip 14 are electrically connected via conventional metallic lines (not shown) located between the outer major surfaces of the support substrate and by solder connections 30' and metallic connectors. The optical fiber interfaces 16b' are laterally separated from the digital signal processing chip 14' along the top major surface of the support substrate 12' by a physical gap 26'.

The heatsinks 18', 20' may be, e.g., conventional metallic heatsinks of various shapes, may be thermally coupled to structures to-be-cooled by conventional thermal interfaces and interface materials, and/or may be themselves cooled by conventional methods, e.g., by air flow(s). The heatsink 18' provides substantial cooling to the digital signal processing chip 14' and has a portion in close thermal contact therewith (heatsink 18' not shown in FIG. 3). The heatsink 20' has portions in close thermal contact with each of the optical fiber substrates 16b', i.e., to provide substantial cooling to all of the optical fiber interfaces 16b'. The heatsink 20' may, e.g., make close physical and/or thermal contact with parts of the major surfaces of the optical fiber interfaces 16b' overlying heat generating devices, e.g., analog electronics. The physical separation of the heatsinks 18' and 20' may enable a largely separate or independent control of the thermal management of the digital signal processing chip 14' and the optical fiber interfaces 16b'.

FIG. 5-6 illustrate structures for electrically and mechanically connecting the optical fiber interfaces 16b' and the support substrate 12' of FIGS. 3-4. FIG. 5 shows that the support substrate 12' includes four Ball Grid Arrays (BGA) of metallic solder bumps 30' located around the central digital signal processing chip 14'. FIG. 6 shows four arrays of metallic connectors 32', which the four optical fiber interfaces 16b' have on lower major surfaces thereof. The metallic connectors 32' may be configured to be attached on the support substrate 12' by thermal reflow of the BGA solder bumps (30') of FIG. 5, i.e., resulting in the structure illustrated in FIG. 6. That is, the solder bumps 30' may match the corresponding configuration of the metallic connectors 32', e.g., to enable formation of female-to-male connections with attachment blocks 36' of the optical fiber interfaces 16b' of FIGS. 7-8. After the mechanical connection between solder bumps 30' and metallic connectors 32' are formed, heat can be used to cause solder reflow on solder bump arrays 30' so that after cool down, solid physical and electrical connections are formed between the solder bumps 30' and the connectors 32', resulting the structure represented in FIG. 6.

FIGS. 7 and 8 illustrate one of the optical fiber interfaces 16b' of FIGS. 3-4 and the optical fibers 28 optically end-coupled thereto with assembled and exploded views, respectively. Each optical fiber interface 16b' includes an attachment block 36' and a planar integrated opto-electrical engine 34' thereon. The attachment block 36' provides mechanical support, e.g., rigidity, and mechanical and electrical connections to the support substrate 12' of FIGS. 3-4. The attachment block 36' includes a 2-dimensional array of the metallic connectors 32', some or all of which are electrically connected to metallic terminals (not shown) on the planar integrated opto-electrical engine 34' via metallic pads 38' on the attachment block 36' (see FIG. 8). The planar integrated opto-electrical engine 34' includes one or more arrays of optical modulators and related analog electrical circuitry and one or more arrays of optical detectors, e.g., photodiodes, and related analog electrical circuitry (not shown), e.g., as described with respect to FIGS. 1-2.

As an example, the planar integrated opto-electrical engine 34' may include spatial arrays, e.g., rows, of optical data modulators and optical detectors for bi-directional optical data communications via the optical fibers 28. The optical data communications may be via optical amplitude modulation and/or optical phase modulation formats. The optical data modulators may be, e.g., Mach-Zehnder interferometers vertically or near vertically coupled to some or all of the optical fibers 28 via optical grating couplers, and the optical photodetectors may be photodiodes or balanced pairs thereof, which vertically or near vertically couple to some or all of the optical fibers 28. Such optical devices optically couple to ends of the optical fibers 28 along a top major surface of the planar integrated opto-electrical engine 34'. To reduce losses, the optical top or detection layers of said photodiodes may be at about the same height with respect to said average top major surface as the optical grating couplers of the optical data modulators. Such an about constant height for optical coupling may lower input/output losses if optical outputs of optical mode converters or optical couplers at ends of the optical fibers 28 of the array are also at about the same distance from said top major surface.

The planar integrated opto-electrical engine 34' includes analog electrical circuitry such as electrical driver circuitry for the optical data modulators; bias circuitry, detection circuitry, trans-impedance amplifier(s) and digital-to-analog converters for the photodetectors; and optionally other analog electrical circuitry. In the planar integrated opto-electrical engine 34', the analog electrical circuitry and optical devices may be monolithically integrated into the same planar substrate, e.g., a silicon or silicon photonics substrate, or may be integrated onto separate planar substrates that are flip-chip bonded together. The analog electrical circuitry electrically connects to the metallic pads 38' and socket connectors 32' of the attachment block 36' by deep vias through the integrated optical engine 34.

The planar integrated opto-electrical engine 34' may also include one or more passive optical devices. Such passive optical devices may include planar optical waveguides, optical grating(s), optical polarization splitter(s) and/or rotator(s), N×M optical coupler(s) (e.g., for N, M=1, 2, 3, . . . ), optical reflectors, variable optical attenuators, optical mode converter(s), optical wavelength multiplexer/demultiplexer(s) and/or optical hybrids for coherent optical detection. End-segments of the optical fibers 28 are mechanically held and aligned in a fiber holder 40'. The fiber holder 40' may include, e.g., a pair of substrates, e.g., glass plates, joined along planar major surfaces thereof so that the end segments of the optical fibers 28 are sandwiched therebetween. In such a sandwich configuration, one of the substrates have an array of parallel V-grooves to align and longitudinally fix the end segments of the optical fibers 28 and may have focusing optics or optical mode converters in the V-grooves to facilitate the optical coupling of ends of the optical fibers to the physical optical ports on the top major surface of the planar integrated opto-electrical engine 34'. The end segments of the optical fibers 28 may be mechanically fixed to one or both of the substrates of the fiber holder 40', e.g., by an epoxy glue or by solder reflowed to adhere to the end segments of the optical fibers 28 and the planar surface(s) of the substrates. If such mechanical fixing is solder-based, the lateral surface of the end-segments of the optical fibers 28 and/or the V-grooves may have metallic coating(s) to enable better adhesion of said solder.

In the optical fiber holder 40', each V-groove may also hold focusing optics or an optical mode converter having an optical input adjacent to the end of one of the optical fibers 28 and an optical output at a preset position from the edge of the fiber holder 40'. In particular, the optical fiber holder 40' may be made to ensure that distance of said optical outputs from the top major surface of planar integrated opto-electrical engine 34' is about the same for the various focusing optics or optical mode converters. Such positioning of the focusing optics or optical mode converters may reduce optical losses, e.g., diffraction and alignment loses, due to the optical coupling to the physical optical ports on the planar integrated opto-electrical engine 34'. Some such focusing optics or optical mode converters may be laterally aligned to face optical couplers, e.g., vertical optical couplers such as optical grating couplers, on the planar integrated opto-electrical engine 34' and others of said focusing optics or optical mode converters may be aligned to face photodiode detectors, made as vertically stacked semiconductor layers, on the planar integrated opto-electrical engine 34'.

Various conventional structures and methods may be used to rigidly align and fix the optical fiber holder 40' with respect to the top major surface of the planar integrated opto-electrical engine 34' and physical optical ports thereon.

For the optical fiber interface(s) 16b', light source(s) for the optical data modulators and/or photodetectors, i.e., in embodiments supporting coherent optical detection, may be external to the planar integrated opto-electrical engine 34' or may be internal to the optical fiber interface(s) 16b'. For the externally coupled embodiments, the light source(s), e.g., conventional telecom laser(s), may be optically coupled to the planar integrated opto-electrical engine 34' via one(s) of the optical fibers 28. The one(s) of the optical fibers 28 coupling such external light source(s) may be, e.g., conventional polarization-maintaining, single-mode optical fibers or other optical fibers configured for carrying high light intensities.

With respect to the apparatus of FIGS. 1 to 8, other embodiments of the optical fiber interfaces 16a, 16b, 16b' may be mechanically and electrically connected to the support substrate 12, 12' by other conventional structures and methods. Such structures and methods may enable easy removal of the optical fiber interfaces 16a, 16b, 16b' while providing adequate electrical and mechanical connectivity during operation.

The Detailed Description of the Illustrative Embodiments and drawings merely illustrate principles of the inventions. Based on the present specification, those of ordinary skill in the relevant art will be able to devise various arrangements that, although not explicitly described or shown herein, embody the inventions and are included within the scope of the claims. Also, statements herein reciting principles, aspects, and embodiments are intended to encompass equivalents thereof.

What is claimed is:

1. An apparatus, comprising:
   a dielectric support substrate having one or more planar major surfaces;
   one or more optical fiber interfaces fixed to the support substrate adjacent one of the one or more planar major surfaces, each of the one or more optical fiber interfaces having optical data modulators and photodetectors, at least one of the one or more optical fiber interfaces including an array of vertical optical couplers along a major surface thereof;
   one or more digital signal processing chips fixed to the support substrate adjacent one of the one or more planar major surfaces, the one or more digital signal processing chips being laterally separated from the one or more optical fiber interfaces along the one or more planar major surfaces and being communicatively connected via metallic lines to the one or more optical fiber interfaces;
   a first set of one or more metallic heatsinks being adjacent the one or more digital signal processing chips to provide heat dissipation therefrom;
   a second set of one or more metallic heatsinks being adjacent the one or more optical fiber interfaces to provide heat dissipation therefrom and being physically separated by some distance from the one or more metallic heatsinks of the first set; and
   a plurality of optical fibers having end segments aligned with the vertical optical couplers to optically couple to the, at least, one of the one or more optical fiber interfaces via a major optical surface thereof.

2. The apparatus of claim 1, wherein each of the one or more optical fiber interfaces includes a monolithically integrated opto-electrical device or a flip-chip connected two-chip opto-electrical module.

3. The apparatus of claim 2, wherein each of the one or more optical fiber interfaces is mechanically connected to the support substrate via an array of metallic socket connectors.

4. The apparatus of claim 3, wherein the sets of one or more metallic heatsinks are configured to maintain the one or more optical fiber interfaces, at least, 10 degrees Centigrade cooler than the one or more digital signal processing chips during steady state operation of the apparatus.

5. The apparatus of claim 3, wherein the sets of one or more metallic heatsinks are configured to maintain the one or more optical fiber interfaces, at least, 20 degrees Centigrade cooler than the one or more digital signal processing chips during steady state operation of the apparatus.

6. The apparatus of claim 1, wherein at least, one of the one or more digital signal processing chips includes digital serializing and/or deserializing circuitry configured to, at least, one of process digital data for transmission to one of the one or more optical fiber interfaces and process digital measurements received from one of the one or more optical fiber interfaces.

7. The apparatus of claim 6, wherein each of the one or more optical fiber interfaces includes a monolithically integrated opto-electrical device or a flip-chip connected two-chip opto-electrical module.

8. The apparatus of claim 7, wherein each of the one or more optical fiber interfaces is mechanically connected to the support substrate via an array of metallic socket connectors.

9. The apparatus of claim 8, wherein the sets of one or more metallic heatsinks are configured to maintain the one or more optical fiber interfaces, at least, 10 degrees Centigrade cooler than the one or more digital signal processing chips during steady state operation of the apparatus.

10. The apparatus of claim 8, wherein the sets of one or more metallic heatsinks are configured to maintain the one or more optical fiber interfaces, at least, 20 degrees Centigrade cooler than the one or more digital signal processing chips during steady state operation of the apparatus.

11. The apparatus of claim 6, wherein the sets of one or more metallic heatsinks are configured to maintain the one or more optical fiber interfaces, at least, 10 degrees Centigrade cooler than the one or more digital signal processing chips during steady state operation of the apparatus.

12. The apparatus of claim 6, wherein the sets of one or more metallic heatsinks are configured to maintain the one or more optical fiber interfaces, at least, 20 degrees Centigrade cooler than the one or more digital signal processing chips during steady state operation of the apparatus.

13. The apparatus of claim 1, wherein the sets of one or more metallic heatsinks are configured to maintain the one or more optical fiber interfaces, at least, 10 degrees Centigrade cooler than the one or more digital signal processing chips during steady state operation of the apparatus.

14. The apparatus of claim 1, wherein the sets of one or more metallic heatsinks are configured to maintain the one or more optical fiber interfaces, at least, 20 degrees Centigrade cooler than the one or more digital signal processing chips during steady state operation of the apparatus.

15. The apparatus of claim 1, further comprising glue fixing locations and alignments of said end segments with respect to the one of the one or more optical fiber interfaces.

16. The apparatus of claim 1, further comprising an optical fiber holder being adjacent the major optical surface and holding said end segments in V-grooves thereof.

17. The apparatus of claim 16, further comprising glue fixing said end segments to said optical fiber holder.

18. The apparatus of claim 16, further comprising solder fixing said end segments to said optical fiber holder.

* * * * *